(12) United States Patent
DiGiacomo

(10) Patent No.: US 7,758,076 B1
(45) Date of Patent: Jul. 20, 2010

(54) TANK CADDY SYSTEM

(76) Inventor: Robert J. DiGiacomo, 659 9th St., Hammonton, NJ (US) 08037

( * ) Notice: Subject to any disclaimer, the term of this patent is extended or adjusted under 35 U.S.C. 154(b) by 853 days.

(21) Appl. No.: 11/595,748

(22) Filed: Nov. 9, 2006

(51) Int. Cl.
*B60P 3/22* (2006.01)

(52) U.S. Cl. .................. 280/839; 280/28.18; 280/830

(58) Field of Classification Search ............ 280/47.131, 280/47.17, 47.24, 47.26, 830–839, 28.18; 414/24, 910, 911; 211/19, 20, 24, 23, 85.18, 211/85.19, 85.21, 85.22; 220/562
See application file for complete search history.

(56) References Cited

U.S. PATENT DOCUMENTS

| | | | | |
|---|---|---|---|---|
| 1,015,592 | A * | 1/1912 | Shryock | 280/107 |
| 1,390,045 | A * | 9/1921 | Kramer | 280/830 |
| 1,422,107 | A * | 7/1922 | Kramer | 280/830 |
| 1,608,552 | A * | 11/1926 | Ellis | 248/129 |
| 1,668,129 | A * | 5/1928 | Spaeth | 280/47.27 |
| 2,490,305 | A * | 12/1949 | Jones | 280/830 |
| 2,567,164 | A * | 9/1951 | Brehany et al. | 280/839 |
| 2,661,982 | A * | 12/1953 | Hudson | 239/159 |
| 2,993,551 | A * | 7/1961 | Finley et al. | 180/213 |
| 3,263,865 | A * | 8/1966 | Kachnik | 222/159 |
| 3,578,348 | A * | 5/1971 | Reinke | 280/839 |
| 3,702,661 | A * | 11/1972 | Berry | 414/812 |
| 3,718,343 | A * | 2/1973 | Mills | 280/124.114 |
| 3,822,800 | A * | 7/1974 | Leszczynski | 414/444 |
| 4,283,066 | A * | 8/1981 | Brown et al. | 280/838 |
| 4,434,991 | A * | 3/1984 | Winterton | 280/830 |
| 4,640,521 | A | 3/1987 | Berfield | |
| 5,240,286 | A * | 8/1993 | Vandenbark et al. | 280/839 |
| 5,354,023 | A * | 10/1994 | Meeks | 248/129 |
| 5,779,255 | A | 7/1998 | Garcia, Jr. | |
| 5,800,117 | A | 9/1998 | Milton | |
| 6,171,048 | B1 * | 1/2001 | Grimes | 414/458 |
| 6,715,195 | B2 * | 4/2004 | Erickson | 29/434 |
| 7,318,608 | B2 * | 1/2008 | Swartz et al. | 280/830 |
| 7,325,814 | B2 * | 2/2008 | Sparacino | 280/47.131 |
| 7,328,907 | B1 * | 2/2008 | Bileth | 280/79.11 |
| 2004/0206517 | A1 * | 10/2004 | Gibbs | 172/42 |
| 2005/0071949 | A1 | 4/2005 | Martinez et al. | |

* cited by examiner

*Primary Examiner*—Glenn Dayoan
*Assistant Examiner*—Vaughn T Coolman
(74) *Attorney, Agent, or Firm*—Norman E. Lehrer

(57) ABSTRACT

A tank caddy system that includes a pair of fixed rear wheels, an axle connecting the rear wheels, the axle having a first support for mounting a tank thereon, a single front wheel that swivels, and a generally rectangular plate mounted on the single front wheel wherein the plate has a second support for mounting the tank thereon. The first support includes two upwardly extending pins located adjacent a respective wheel. The plate includes a pair arms extending outwardly from the sides of the plate and the second support includes a pin extending upwardly from each arm. A pair of handles is secured to the legs of the tank. A pair of clamps for providing additional support to the tank is secured to a respective arm of the plate. Each of the pins of the first and second support fits within a respective leg of the tank.

15 Claims, 3 Drawing Sheets

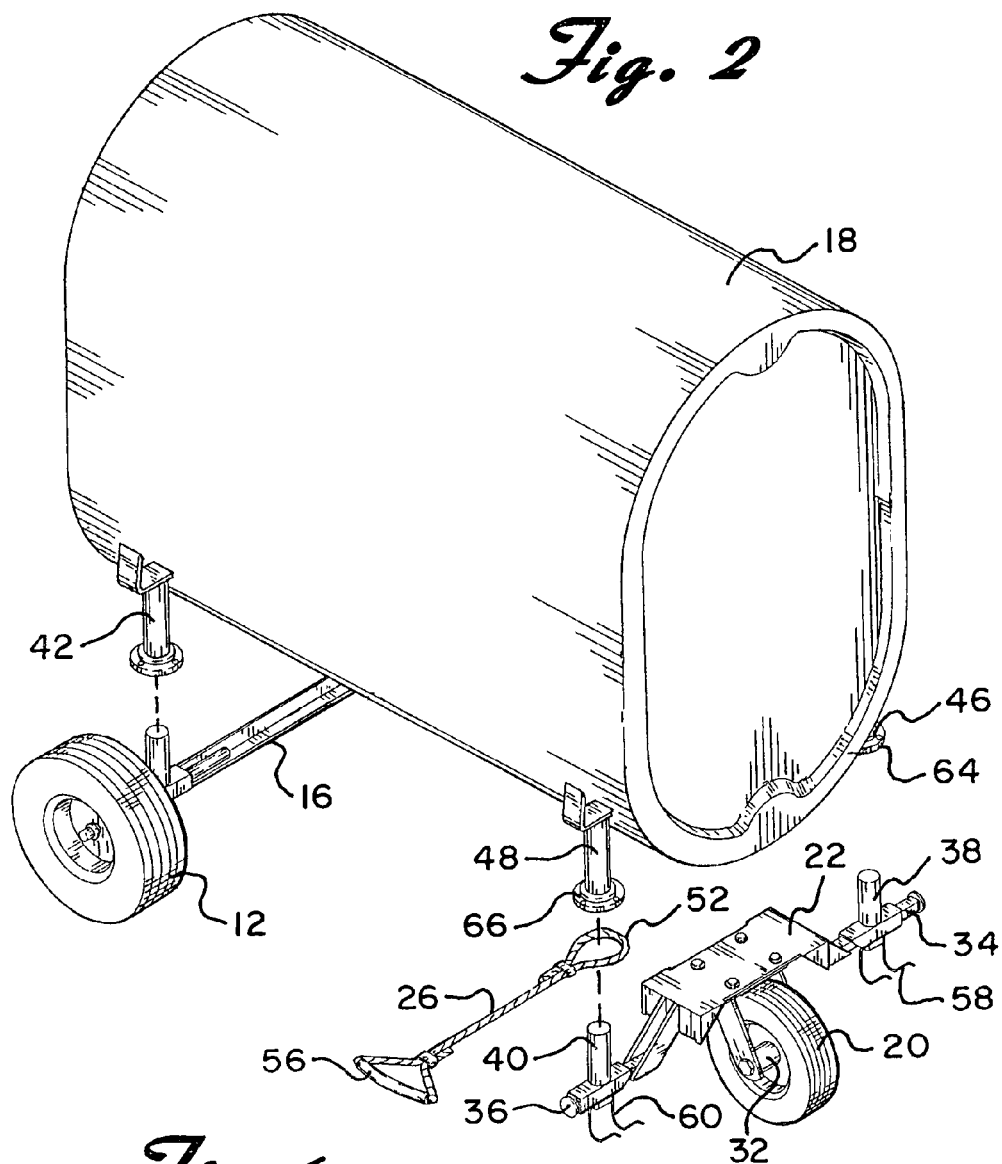
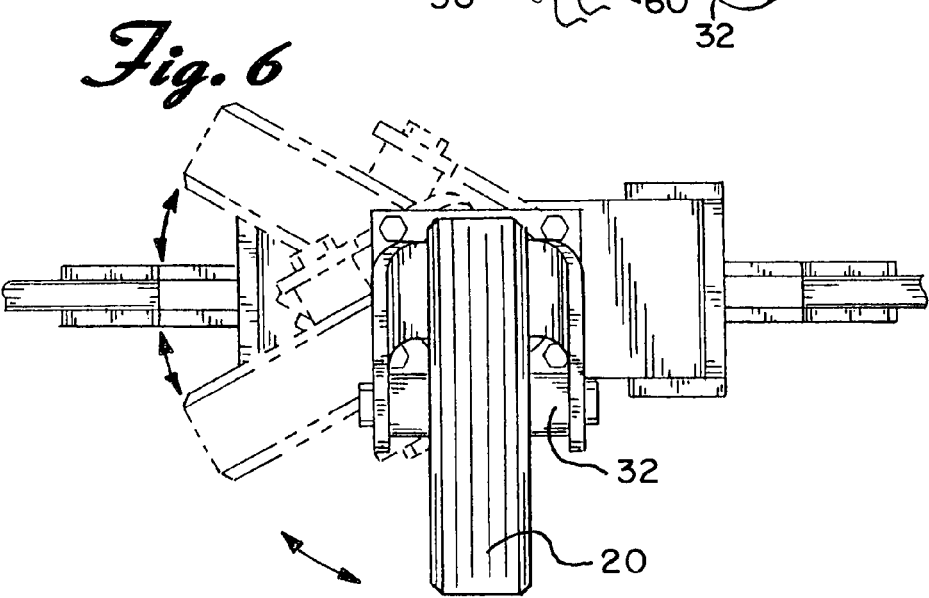

TANK CADDY SYSTEM

BACKGROUND OF THE INVENTION

The present invention is directed toward a caddy system for transporting an oil or propane tank and more particularly, toward a caddy system that allows a tank to be moved safely and efficiently.

Many of the oil tanks used in residential and small commercial settings are constructed of steel. Due to their construction and generally elliptical shape, they pose a problem when they need to be transported for removal or for installation. Specifically, securing a tank to a dolly can be somewhat problematic. Also, the mobility of a tank due to its bulk and weight may also cause problems when transporting the tank. Furthermore, transporting the tank over difficult terrain such as grass lawns, stones, and soft sand often proves to be quite challenging. These problems may lead to physical injury to the worker, property damage, tank damage, and the like which turn may cause delays and increase expenses.

Attempts have been made to alleviate some of the problems described above. For example, U.S. Pat. No. 5,779,255 to Garcia, Jr. discloses a wheeled carrier for a tank. The tank may be secured with rear and front supports that can be attached to a tank's legs. However, this carrier appears to have a somewhat complex structure.

Also, U.S. Pat. No. 5,800,117 to Milton discloses a tank lifting and transporting apparatus that includes wheels and supports for the legs of the tank. The apparatus also includes a winch for lifting the tank. However, this apparatus appears to be somewhat complicated to use and does not appear to maneuver with ease.

Therefore, a need exists for a system that provides a simple, safe, economical, and cost effective procedure for transporting and assisting in the installation or removal of oil storage or similar tanks in commercial and residential settings.

SUMMARY OF THE INVENTION

The present invention is designed to overcome the deficiencies of the prior art discussed above. It is an object of the present invention to provide a tank caddy system that is an effective means for transporting tanks safely and efficiently.

It is another object of the present invention to provide a tank caddy system that allows for ease in maneuvering a tank during transport.

A further object of the present invention is to provide a tank caddy system that may be used with a wide variety of tanks.

In accordance with the illustrative embodiments demonstrating features and advantages of the present invention, there is provided herein a tank caddy system that includes a pair of fixed rear wheels, an axle connecting the pair of rear wheels, the axle having first means for mounting a tank thereon, a single front wheel, and a generally rectangular plate mounted on the single front wheel wherein the plate has second means for mounting the tank thereon. The first mounting means includes two upwardly extending pins located on either side of center and adjacent a respective wheel. The plate includes a pair arms extending outwardly from the sides of the plate and the second mounting means includes a pin extending upwardly from each arm. A pair of handles is secured to the legs of the tank. A pair of clamps for providing additional support to the tank is secured to a respective arm of the plate. Each of the pins of the first mounting means fits within a respective leg of the tank. Likewise, each of the pins of the second mounting means fits within a respective leg of the tank. The front wheel is adapted to swivel.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form that is presently preferred; it being understood that the invention is not intended to be limited to the precise arrangements and instrumentalities shown.

FIG. 2 illustrates a tank being placed on the caddy of the present invention;

FIG. 6 is a cross-sectional view taken through line 6-6 of FIG. 1.

DETAILED DESCRIPTION OF THE PREFERRED EMBODIMENT

Figure 1:
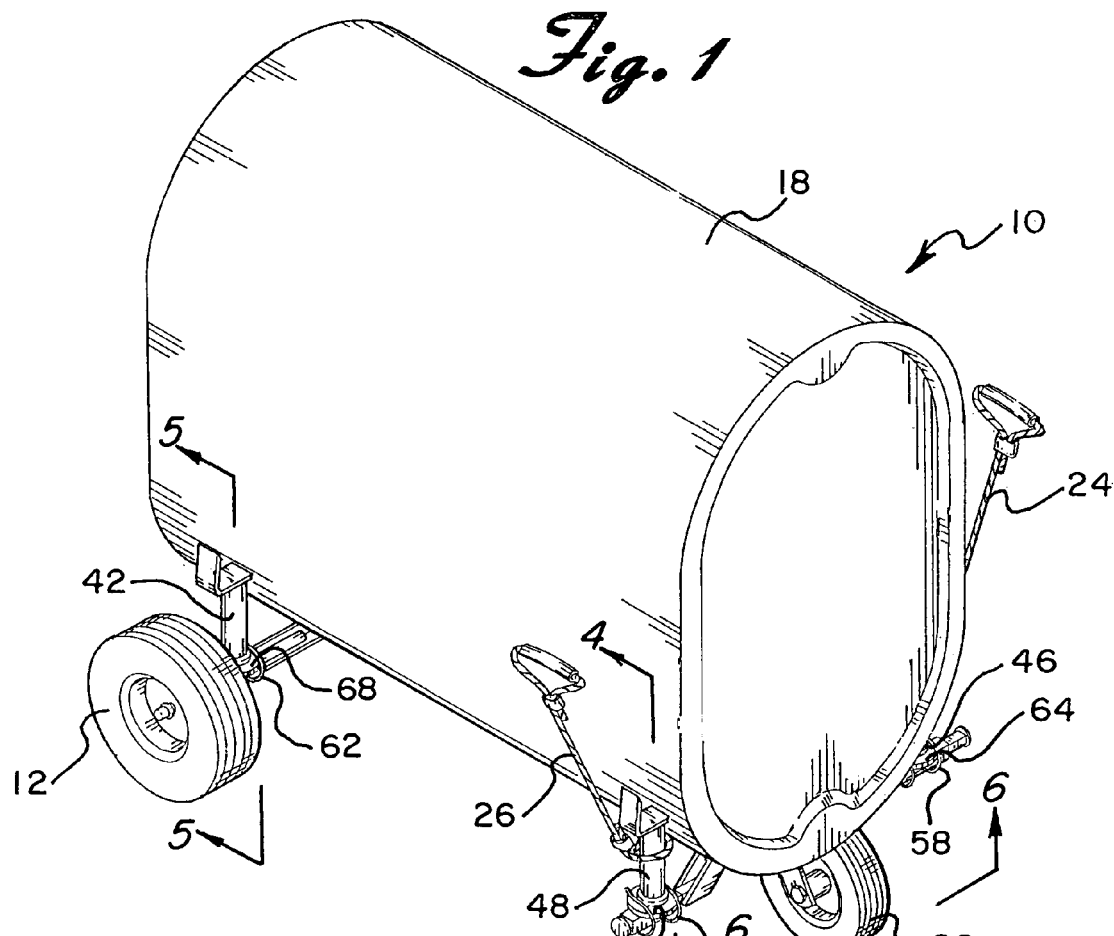
FIG. 1 illustrates the tank caddy of the present invention with a tank mounted thereon.

Referring now to the drawings in detail wherein like reference numerals have been used throughout the various figures to designate like elements, there is shown in FIG. 1 a tank caddy system constructed in accordance with the principles of the present invention and designated generally as 10.

Figure 3:
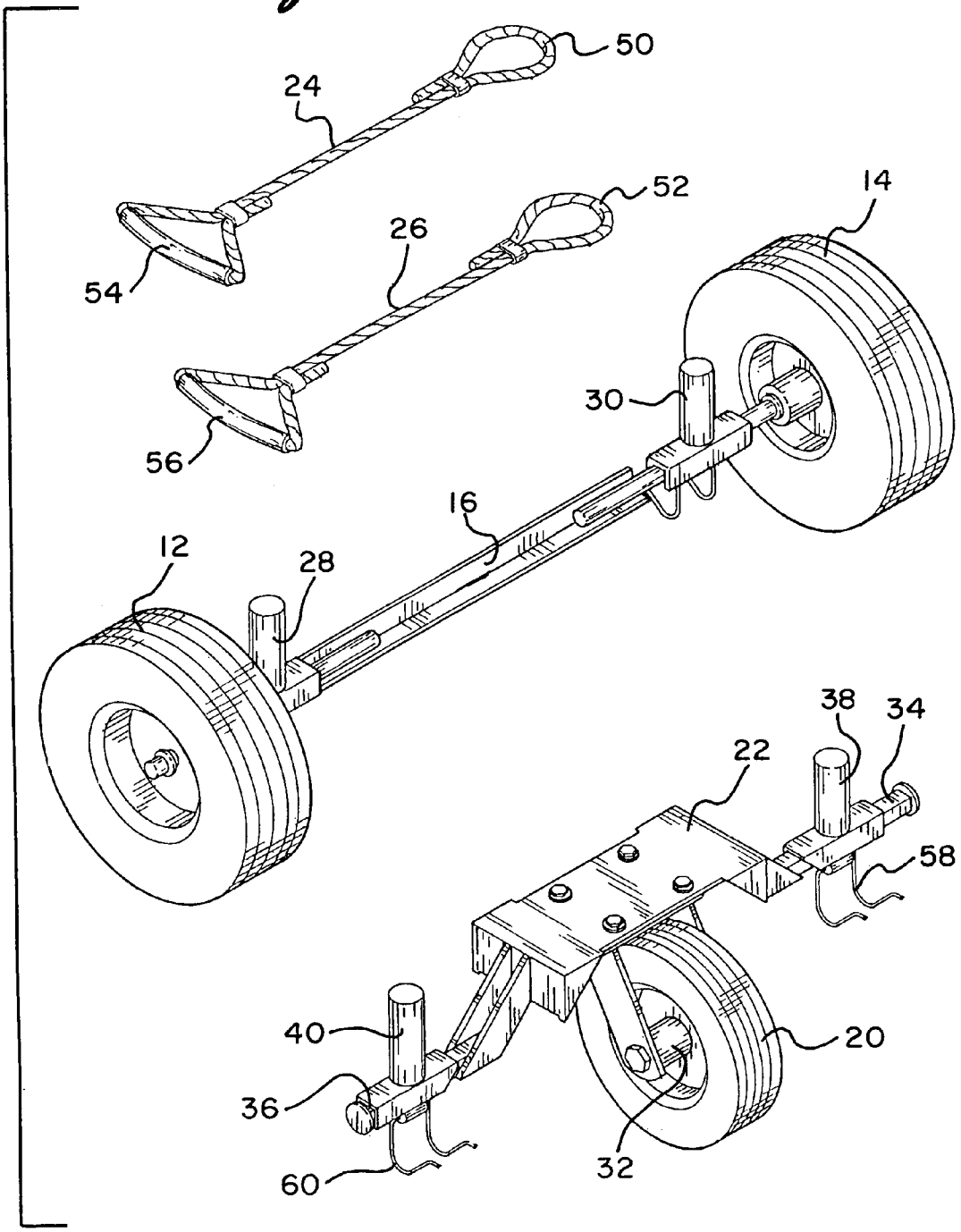
FIG. 3 is an exploded view of the tank caddy system of the present invention.

The tank caddy system of the present invention essentially includes a pair of fixed rear wheels 12 and 14, an axle 16 connecting the pair of rear wheels 12 and 14, the axle 16 having first means for mounting a tank 18 thereon, a single front wheel 20, and a generally rectangular plate 22 mounted on the single front wheel 20 where the front wheel 20 is adapted to swivel. The plate 22 has second means for mounting the tank 18 thereon. The system also includes a pair of handles 24 and 26. (See FIG. 3.)

Figure 5:
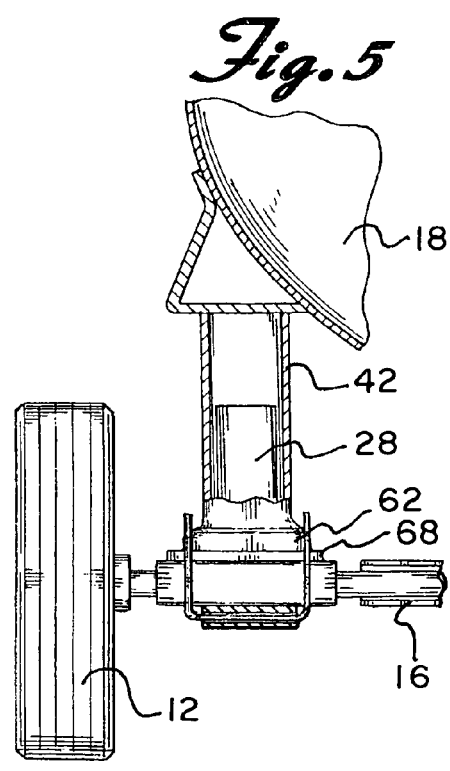
FIG. 5 is a cross-sectional view taken through line 5-5 of FIG. 1.
Figure 4:
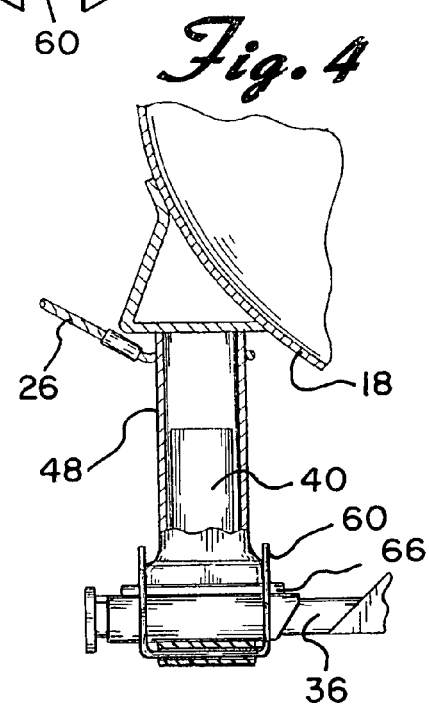
FIG. 4 is a cross-sectional view taken through line 4-4 of FIG. 1.

The first mounting means includes two upwardly extending pins or risers 28 and 30 located adjacent a respective rear wheels 12 and 14. (See FIG. 3.) The plate 22 is secured to the axle 32 of the front wheel 20 and includes a pair of arms 34 and 36 extending outwardly from the sides of the plate 22. The second mounting means includes pins 38 and 40 extending upwardly from respective arms 34 and 36. Each of the pins 28 and 30 of the first mounting means fits within a respective leg 42 and 44 (not shown) of the tank 18. (See FIG. 5.) Likewise, each of the pins 38 and 40 of the second mounting means fits within a respective leg 46 and 48 of the tank 18. (See FIG. 4.)

Each of the handles 24 and 26 is secured to a respective front leg 46 and 48 of the tank 18 as will be described in greater detail below. Each handle 24 and 26 includes a looped end 50 and 52 and grips 54 and 56, respectively. (See FIG. 3.) A pair of spring clamps 58 and 60 for providing additional support to the tank 18 is secured to a respective arm 34 and 36 of the plate 22. Spring clamps, shown as clamp 62 for example, may also be attached adjacent the pins 28 and 30 of the rear mounting means. (See FIGS. 1 and 5.)

In order to use the tank caddy system of the present invention, the rear legs 42 and 44 of the tank 18 are mounted onto the pins 28 and 30 of the rear axle assembly. The front legs 46 and 48 of the tank 18 are then mounted onto the pins 38 and 40 of the front wheel 20. (See FIG. 2.) The spring clamps 58 and 60 are then pivoted around and snapped into place against the flanges or feet 64 and 66 of the legs 46 and 48 of the tank 18. (See FIG. 1.) The looped ends 50 and 52 of handles 24 and 26, respectively, are placed behind legs 46 and 48 and the grips 54 and 56 are threaded through the loops 50 and 52, respectively, and pulled taut. (See FIG. 1.) The swiveling nature of the front wheel 20 (see FIG. 6) allows for ease in steering. The handles 24 and 26 may be used to guide the tank 18 during transport. A slight lift on both handles 24 and 26 and movement in any direction (backward, forward, or side-to-side) is all that is needed in order to steer and maneuver the tank.

The tank caddy system of the present invention may accommodate a wide variety of most residential and small commercial tanks. The twin axle design of the present invention allows for quick and easy adjustments. Both the front and rear mounting pins 28, 30, 38 and 40 are mounted so as to allow for telescoping movement toward and away from each other so as to accommodate different size tanks that may have their legs spaced differently. The swivel front wheel assembly allows for ease in steering, maneuvering, and otherwise moving the tank.

The present invention may be embodied in other specific forms without departing from the spirit or essential attributes thereof and accordingly, reference should be made to the appended claims rather than to the foregoing specification as indicating the scope of the invention.

I claim:

1. A tank caddy system for transporting a tank having legs comprising:
   a pair of fixed rear wheels;
   an axle connecting said pair of rear wheels;
   said axle having first means for mounting a tank thereon and said first mounting means includes two upwardly extending pins located adjacent a respective wheel and each of said pins of said first mounting means fits within a respective leg of the tank;
   a single front wheel;
   a plate mounting said single front wheel allowing for pivotal movement; and
   second means for mounting said tank carried by said plate.

2. The tank caddy system of claim 1 wherein said plate includes a pair arms extending outwardly from the sides of said plate and said second mounting means includes a pin extending upwardly from each arm.

3. The tank caddy system of claim 2 wherein each of said pins of said second mounting means fits within a respective leg of the tank.

4. The tank caddy system of claim 3 further including a pair of handles wherein each of said handles is secured to a leg of the tank.

5. The tank caddy system of claim 2 further including a pair of clamps for providing additional support to the tank wherein each of said clamps is secured to a respective arm of said plate.

6. The tank caddy system of claim 1 wherein said mounting means are mounted so as to be moveable toward and away from each other in order to accommodate different size tanks.

7. A tank caddy system for transporting a tank having legs comprising:
   a pair of fixed rear wheels;
   an axle connecting said pair of rear wheels;
   said axle having first means for mounting a tank thereon;
   a single front wheel;
   a plate mounting said single front wheel allowing for pivotal movement;
   second means for mounting said tank carried by said plate; and
   a pair of handles and each of said handles is secured to a leg of the tank
   wherein said plate includes a pair arms extending outwardly from the sides of said plate and said second mounting means includes a pin extending upwardly from each arm.

8. The tank caddy system of claim 7 wherein each of said pins of said second mounting means fits within a respective leg of the tank.

9. The tank caddy system of claim 7 wherein said mounting means are mounted so as to be moveable toward and away from each other in order to accommodate different size tanks.

10. The tank caddy system of claim 7 wherein said first mounting means includes two upwardly extending pins located adjacent a respective wheel.

11. The tank caddy system of claim 7 further including a pair of clamps for providing additional support to the tank wherein each of said clamps is secured to a respective arm of said plate.

12. A tank caddy system for transporting a tank having legs comprising:
   a pair of fixed rear wheels;
   an axle connecting said pair of rear wheels;
   said axle having first means for mounting a tank thereon;
   a single front wheel;
   a plate mounting said single front wheel allowing for pivotal movement; and
   second means for mounting said tank carried by said plate
   wherein said plate includes a pair arms extending outwardly from the sides of said plate and said second mounting means includes a pin extending upwardly from each arm, each of said pins of said second mounting means fitting within a respective leg of the tank.

13. The tank caddy system of claim 12 further including a pair of clamps for providing additional support to the tank wherein each of said clamps is secured to a respective arm of said plate.

14. The tank caddy system of claim 12 wherein said mounting means are mounted so as to be moveable toward and away from each other in order to accommodate different size tanks.

15. The tank caddy system of claim 12 wherein said first mounting means includes two upwardly extending pins located adjacent a respective wheel.

* * * * *